W. F. COCHRANE.
Hemp-Harvesters.

No. 158,909. Patented Jan. 19, 1875.

Witnesses:
H. S. Devine
Wm. J. Peyton

Inventor.
William F. Cochrane
By James L. Norris
Atty.

UNITED STATES PATENT OFFICE.

WILLIAM F. COCHRANE, OF LA FAYETTE, INDIANA.

IMPROVEMENT IN HEMP-HARVESTERS.

Specification forming part of Letters Patent No. 158,909, dated January 19, 1875; application filed October 31, 1872.

*To all whom it may concern:*

Be it known that I, WILLIAM F. COCHRANE, of La Fayette, in the county of Tippecanoe and State of Indiana, have invented certain new and useful Improvements in Hemp-Harvesters; and I do hereby declare the following to be a full and exact description of the same, reference being had to the accompanying drawings, forming part of this specification, in which—

Figure 1:
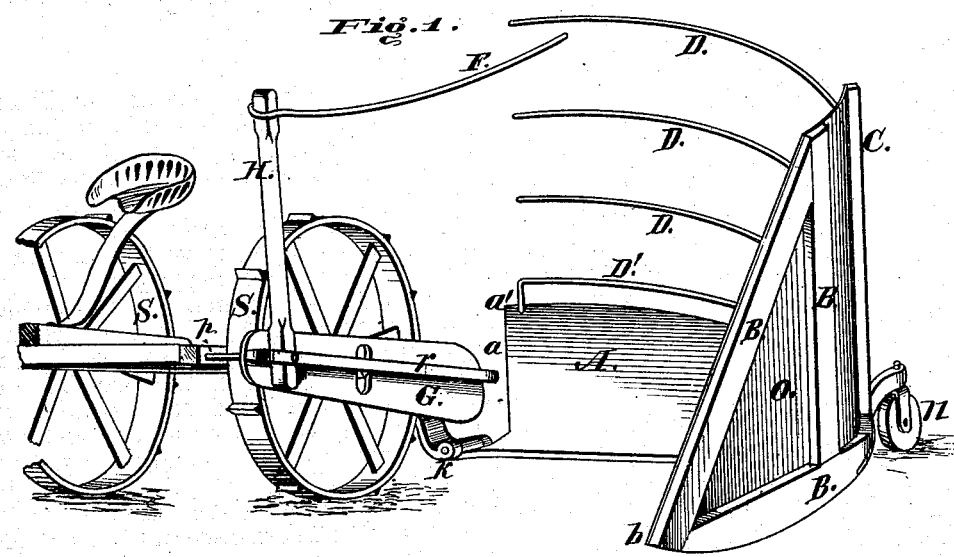
Figure 2:
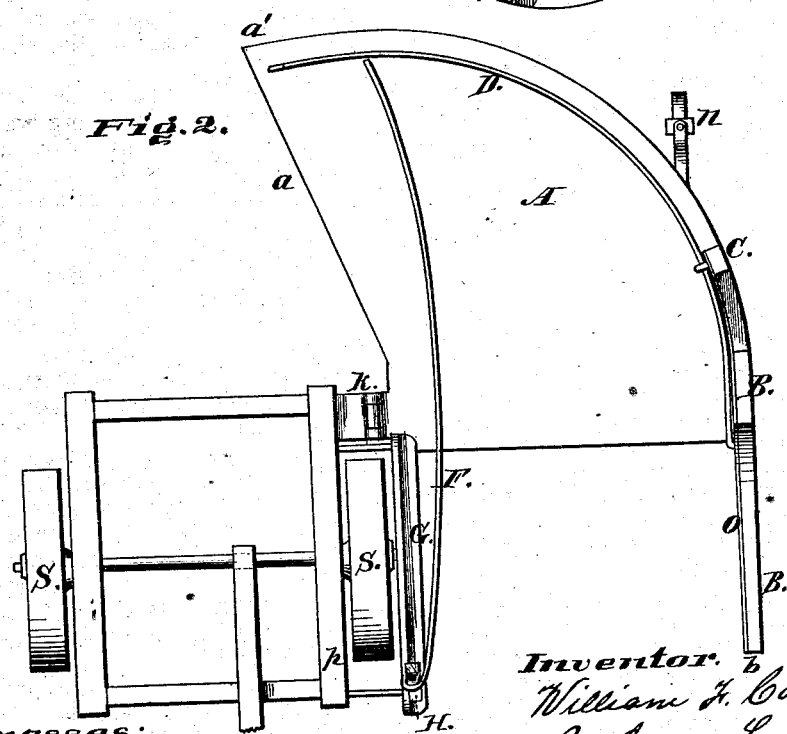

Figure 1 is a perspective view of the hemp-harvester, and Fig. 2 is a top-plan view of the same.

Similar letters of reference in the accompanying drawings denote the same parts.

My invention relates to that class of harvesters which are employed for cutting hemp; and it consists, first, in a vertical divider provided with a series of curved fingers at its rear end, arranged one over the other, in combination with a quadrant-shaped platform, for the purpose of separating the growing hemp from the bottom to the top of the stalks, and to receive and guide the cut hemp in a standing position, preparatory to binding it into gavels. It also consists in an elevated guide-finger supported near the front corner of the frame and extending rearward to intersect the divider-fingers, for the purpose of holding the cut stalks in an upright position upon the platform, and prevent them from falling inward upon the machine or attendants.

In the accompanying drawings, $p$ is the main frame of the harvester, supported by the driving-wheels S, and having the cutting mechanism hinged to its rear end in the usual manner. A is the quadrant or equivalent shaped platform extending the entire length, or nearly so, of the finger-bar, and projecting to the rear thereof. B is the triangular frame of the divider, mounted upon the outer corner of the platform, so that one point or angle, $b$, shall project in front of the same at some distance above the ground, or the plane of the platform. C is a post rising from the outer side of the platform, in rear of the frame B, and O is a sheet-metal plate or other suitable facing, secured to the post and inner side of the frame, for the purpose of forming a smooth surface, along which the hemp shall slide to the rear of the platform. D D are metal rods or fingers, secured at one end to the rear of the divider or post C, one over the other. From this point they are curved rearward to conform to the boundary-line of the platform, and terminate at the rear end thereof above the corner $a'$. The lower finger, $D'$, is bent at its outer end to enter the platform, and thus form a guide-railing to prevent the butts of the cut hemp from being forced off the platform, while the outer ends of the remaining fingers are unsupported. G is a shield, bolted to the frame of the machine outside the inner driving-wheel, and provided with a rib, $r$, to guide the hemp back to the cutters, and prevent it from coming in contact with such wheel. H is an upright at or near the front inner corner of the frame, and F is the flexible guide-finger, preferably a rod of metal, secured to its upper end, so as to extend rearward and intersect the divider-fingers, as shown.

When the machine is in operation, the divider enters the standing hemp and divides it from the top downward to a point near the bottom of the stalks, guiding the portion in front of the cutting mechanism directly upon the platform in an upright position, while the finger F guides the tops of the stalks inward toward the divider in front of the cutters, so as to insure their being cut. The rear portion of the divider, together with the fingers D, guides the cut hemp to the rear of the platform along the curved outer side, and the finger F guides it to the same point along the inner side.

The fingers F and D are made flexible, so that while they sustain the hemp in an upright position on the platform they readily yield to the additional pressure applied by the raker, and separate sufficiently to permit the discharge of the gavels from the platform.

If desired, a seat may be arranged on the main frame in rear of the driver's seat, for the use of the raker.

The flexibility of the finger F adapts it to be bent, so as to intersect the fingers D, or to lie outside the ends thereof, as circumstances may require.

Having thus described my invention, what I claim as new is—

1. In a hemp attachment for harvesters, the combination of the vertical divider and curved divider-fingers with the quadrant-shaped platform, substantially as described, for the purposes specified.

2. The elevated guide-finger, supported near the front corner of the main frame, and extending rearward to intersect the divider-fingers, for the purpose of holding the cut stalks in an upright position, substantially as described.

In testimony that I claim the foregoing I have hereunto set my hand.

WM. F. COCHRANE.

Witnesses:
ALBERT H. NORRIS,
JAMES L. NORRIS.